(12) United States Patent
Tsai et al.

(10) Patent No.: US 8,527,768 B2
(45) Date of Patent: Sep. 3, 2013

(54) MOBILE STATION, ACCESS POINT, GATEWAY APPARATUS, BASE STATION, AND HANDSHAKE METHOD THEREOF FOR USE IN A WIRELESS NETWORK FRAMEWORK

(75) Inventors: Frank Chee-Da Tsai, Taipei (TW); Chien-Chien Chiu, Yonghe (TW); I-Hung Lin, Taipei (TW); Hung-Min Sun, Taichung (TW); Shuai-Min Chen, Xizhi (TW); Yao-Hsin Chen, Shalu Town (TW); Heng-Jeng Chung, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 860 days.

(21) Appl. No.: 12/361,361

(22) Filed: Jan. 28, 2009

(65) Prior Publication Data
US 2010/0138661 A1 Jun. 3, 2010

(30) Foreign Application Priority Data
Dec. 1, 2008 (TW) ................................ 97146589 A

(51) Int. Cl.
*H04L 9/32* (2006.01)
(52) U.S. Cl.
USPC ........................... 713/171; 713/169; 380/277
(58) Field of Classification Search
USPC ....................................................... 713/171
See application file for complete search history.

(56) References Cited

U.S. PATENT DOCUMENTS

| 7,263,357 B2 * | 8/2007 | Lee et al. .................... 455/432.1 |
| 2004/0203783 A1 * | 10/2004 | Wu et al. ........................ 455/436 |
| 2005/0239453 A1 * | 10/2005 | Vikberg et al. ............. 455/426.1 |
| 2006/0111112 A1 * | 5/2006 | Maveddat ....................... 455/439 |
| 2007/0064661 A1 * | 3/2007 | Sood et al. ..................... 370/338 |
| 2007/0160017 A1 | 7/2007 | Meier et al. |
| 2007/0258465 A1 * | 11/2007 | Ma et al. .................. 370/395.53 |
| 2008/0267407 A1 * | 10/2008 | Vanderveen ................. 380/277 |
| 2008/0298237 A1 * | 12/2008 | Dos Remedios et al. ..... 370/233 |
| 2008/0301797 A1 * | 12/2008 | Mathai et al. ................... 726/12 |
| 2009/0271626 A1 * | 10/2009 | Wang ............................ 713/170 |

(Continued)

FOREIGN PATENT DOCUMENTS
EP 1 705 940 A1 9/2006

OTHER PUBLICATIONS

"A Fast and Heterogeneous Handover Architecture based on an extended EAP lower-layer", by Rafa Marin Lopez et al., 2007.*

*Primary Examiner* — Kambiz Zand
*Assistant Examiner* — Yonas Bayou
(74) *Attorney, Agent, or Firm* — Patterson Thuente Pedersen, P.A.

(57) ABSTRACT

A mobile station, an access point, a gateway apparatus, a base station, and a handshake method thereof for use in a wireless network framework are provided. The wireless network framework comprises a first wireless network comprising the access point, and a second wireless network comprising the gateway apparatus and base station. There is an IP security tunnel between the access point and the gateway apparatus. When the mobile station handovers from the first wireless network to the second wireless network, it transmits a master session key to the gateway apparatus via the access point and the IP security tunnel. Additionally, when the mobile station handovers from the second wireless network to the first wireless network, it transmits a master session key to the access point. As a result, the authentication time, which is needed in handover procedure between the first wireless network and the second wireless network, is reduced effectively.

38 Claims, 15 Drawing Sheets

(56) References Cited

U.S. PATENT DOCUMENTS

| | | | |
|---|---|---|---|
| 2010/0061232 A1* | 3/2010 | Zhou et al. | 370/230 |
| 2010/0085949 A1* | 4/2010 | von Brandt et al. | 370/338 |
| 2010/0211786 A1* | 8/2010 | Lim et al. | 713/169 |
| 2010/0323700 A1* | 12/2010 | Bachmann et al. | 455/436 |
| 2010/0325714 A1* | 12/2010 | Iyer et al. | 726/8 |
| 2011/0047612 A1* | 2/2011 | D'ambrosio et al. | 726/12 |

* cited by examiner

MOBILE STATION, ACCESS POINT, GATEWAY APPARATUS, BASE STATION, AND HANDSHAKE METHOD THEREOF FOR USE IN A WIRELESS NETWORK FRAMEWORK This application claims the benefit of priority based on Taiwan Patent Application No. 097146589 filed on Dec. 1, 2008, the disclosures of which are incorporated by reference herein in their entirety.

CROSS-REFERENCES TO RELATED APPLICATIONS

Not applicable.

BACKGROUND OF THE INVENTION

1. Field of the Invention

The present invention provides a mobile station, an access point, a base station, a gateway apparatus, and a handshake method thereof for use in a wireless network framework. More particularly, the present invention provides a mobile station, an access point, a base station, a gateway apparatus, and a handshake method thereof for use in a wireless network framework comprising a WiMAX network and a WiFi network.

2. Descriptions of the Related Art

With the continuous advancement in science and technology, higher requirements are being imposed on communications. Nowadays, more importance is being placed on the convenience, as well as the quality of communications. Among the various communication means, wireless communications are preferred because of their mobility and lack of reliance on the physical communication network wiring. Therefore, wireless-communication-enabled mobile products such as mobile phones, notebook computers and the like are gaining more popularity over recent years and have become the mainstream products in the consumer electronics market.

However, due to the relative signal strength or other factors, mobile products operating in a wireless network environment will inevitably perform a handover over between two networks adopting different wireless network standards to maintain a certain quality of service (QoS). For instance, a mobile product may perform the handover from a WiFi wireless network to a WiMAX wireless network or vice versa.

In more detail, a mobile product operating on a WiMAX wireless network or a WiFi wireless network may be considered as a client. When logging onto the WiMAX/WiFi wireless network for its service, the client must be authenticated as a legal client, usually through an authentication mechanism in the WiMAX/WiFi wireless network. For example, when the client is moving away from the coverage of the WiMAX wireless network towards the coverage of the WiFi wireless network, the signal strength of the WiMAX wireless network will fade away while that of the WiFi wireless network will gradually become stronger for the client. Therefore, to maintain a certain quality of service, the client will perform the handover from the WiMAX wireless network to the WiFi wireless network. Because both the WiMAX wireless network and the WiFi wireless network have respective authentication mechanisms, the client will be subjected to an authentication procedure of the WiFi wireless network before it can perform the handover to the WiFi wireless network, which may substantially prolong the time needed for the client's handover to the WiFi wireless network. Similarly, when the client is performing the handover from the WiFi wireless network to the WiMAX wireless network, the client will also be subjected to an authentication procedure of the WiMAX wireless network before it can handover to the WiMAX wireless network, which may substantially prolong the time needed for the client's handover to the WiMAX wireless network. Consequently, the service efficiency of the overall wireless network is degraded.

According to the aforementioned descriptions, a substantial portion of time is spent in the authentication procedure when the client performs handover. Accordingly, it is important to effectively reduce the authentication time to, thereby, improve the service efficiency of the overall wireless network.

SUMMARY OF THE INVENTION

An objective of this invention is to provide a mobile station, an access point, a base station, a gateway apparatus, and a handshake method thereof for use in a wireless network framework. The wireless network framework comprises a first wireless network and a second wireless network, in which the first wireless network comprises the access point and the second wireless network comprises the base station and the gateway apparatus. According to this invention, when a handover from the first wireless network to the second wireless network is performed, the mobile station only needs to transmit a master session key to the gateway apparatus of the second wireless network instead of generating a new master session key through the authentication mechanism of the second wireless network, wherein the master session key is generated when the mobile station is authenticated in the first wireless network. Similarly, when a handover from the second wireless network to the first wireless network is performed, the mobile station only needs to transmit a master session key to the access point of the first wireless network, wherein the master session key is generated when the mobile station is authenticated in the second wireless network. This effectively reduces the authentication time needed in the handover procedure of the mobile station (client) between the first wireless network and the second wireless network.

To achieve the objective, when the mobile station intends to perform the handover from the first wireless network to the second wireless network, an IP security tunnel has to be present between the access point and the gateway apparatus. The access point stores an identification of the mobile station, while the mobile station comprises a storage module, a transmission/receiving module, and a process module. The storage module is configured to store a master session key. The transmission/receiving module is configured to transmit the master session key and a notification signal to the access point so that the access point is able to transmit the master session key and the identification to the gateway apparatus via the IP security tunnel after the access point receives the notification signal. Furthermore, the transmission/receiving module is configured to transmit a subscriber station basic capability request signal to the base station and receive a subscriber station basic capability response signal from the base station after the transmission of the subscriber station basic capability request signal. The process module is configured to generate an authorization key according to the master session key, decrypt the subscriber station basic capability response signal according to the authorization key, and perform a handshake with the base station with the authorization key.

In addition, for the mobile station to perform the handover from the first wireless network to the second wireless network, a handshake method for use in the mobile station comprises the following steps of: transmitting the master session key to the access point; transmitting a notification signal to the access point so that the access point transmits the master session key and the identification to the gateway apparatus via the IP security tunnel after the access point receives the notification signal; generating an authorization key according to the master session key and the identification; transmitting a subscriber station basic capability request signal to the base station; receiving a subscriber basic station capability response signal from the base station after the transmission of the subscriber station basic capability request signal; decrypting the subscriber station basic capability response signal according to the authorization key; and performing the handshake with the base station with the authorization key.

Furthermore, for the mobile station to perform the handover from the first wireless network to the second wireless network, the access point comprises a storage module and a transmission/receiving module. The storage module is configured to store an identification and a master session key of the mobile station. The transmission/receiving module is configured to (a) build an IP security tunnel between the access point and the gateway apparatus, (b) receive a notification signal from the mobile station, and (c) transmit the identification and the master session key to the gateway apparatus via the IP security tunnel after receiving the notification signal so that the gateway apparatus generates an authorization key according to the master session key and transmits the authorization key to the base station so that the base station and the mobile station can perform the handshake with the authorization key.

Similarly, for the mobile station to perform the handover from the first wireless network to the second wireless network, a handshake method for use in the access point comprises the following steps of: (a) building an IP security tunnel between the access point and the gateway apparatus; (b) receiving a notification signal from the mobile station; and (c) transmitting the identification and the master session key to the gateway apparatus via the IP security tunnel after receiving the notification signal so that the gateway apparatus generates an authorization key according to the master session key and transmits the authorization key to the base station so that the base station and the mobile station perform the handshake with the authorization key.

Also to this end, for the mobile station to perform the handover from the first wireless network to the second wireless network, the gateway apparatus comprises a transmission/receiving module and a process module. The transmission/receiving module is configured to build an IP security tunnel between the access point and the gateway apparatus and receive the identification and the master session key from the access point via the IP security tunnel. The process module is configured to generate an authorization key according to the master session key. The transmission/receiving module is further configured to receive a mobile station preattachment request signal from the base station, wherein the mobile station preattachment request signal is generated by the base station after the base station receives a subscriber station basic capability request signal. The transmission/receiving module is further configured to transmit a mobile station preattachment response signal comprising the authorization key to the base station after receiving the mobile station preattachment request signal so that the base station is able to generate and transmit a subscriber station basic capability response signal to the mobile station according to the authorization key so that the base station and the mobile station perform the handshake according to the subscriber station basic capability response signal.

Also to this end, for the mobile station to perform the handover from the first wireless network to the second wireless network, a handshake method for use in the gateway apparatus comprises the following steps of: building an IP security tunnel between the access point and the gateway apparatus; receiving the master session key and the identification from the access point via the IP security tunnel; generating an authorization key according to the master session key; receiving a mobile station preattachment request signal from the base station, wherein the mobile station preattachment request signal is generated by the base station after the base station receives a subscriber station basic capability request signal; and transmitting a mobile station preattachment response signal comprising the authorization key to the base station after the receipt of the mobile station preattachment request signal so that the base station is able to generate and transmit a subscriber station basic capability response signal to the mobile station according to the authorization key so that the mobile station and the base station perform the handshake according to the subscriber station basic capability response signal.

Also to this end, for the mobile station to perform the handover from the first wireless network to the second wireless network, the base station comprises a transmission/receiving module and a process module. The transmission/receiving module is configured to receive a subscriber station basic capability request signal from the mobile station, transmit a mobile station preattachment request signal to the gateway apparatus after the receipt of the subscriber station basic capability request signal, receive a mobile station preattachment response signal comprising the authorization key from the gateway apparatus, and transmit a subscriber station basic capability response signal to the mobile station after the receipt of the mobile station preattachment response signal. The process module is configured to generate the mobile station preattachment request signal after the receipt of the subscriber station basic capability request signal and generate the subscriber station basic capability response signal according to the mobile station preattachment response signal. The transmission/receiving module is further configured to perform the handshake with the mobile station after the mobile station receives the subscriber station basic capability response signal.

Also to this end, for the mobile station to perform the handover from the first wireless network to the second wireless network, a handshake method for use in the base station comprises the following steps of: receiving a subscriber station basic capability request signal from the mobile station; transmitting a mobile station preattachment request signal to the gateway apparatus after the receipt of the subscriber station basic capability request signal; receiving a mobile station preattachment response signal comprising the authorization key from the gateway apparatus; transmitting a subscriber station basic capability response signal to the mobile station after the receipt of the mobile station preattachment response signal; and performing the handshake with the mobile station after the mobile station receives the subscriber station basic capability response signal.

For the mobile station to perform the handover from the second wireless network to the first wireless network, an IP security tunnel must exist between the access point and the gateway apparatus. The mobile station comprises a storage module, a transmission/receiving module, and a process module. The storage module is configured to store a master session key. The transmission/receiving module is configured to transmit the master session key and a notification signal to the base station so that the base station can transmit the master session key and the notification signal to the gateway apparatus to make the gateway apparatus transmit the master session key to the access point via the IP security tunnel after the receipt of the notification signal. The transmission/receiving module is further configured to transmit an association request signal to the access point and receive an association response signal from the access point after the transmission of the association request signal. The process module is configured to generate a pair-wise temporary key according to the master session key. The transmission/receiving module is further configured to perform the handshake with the access point with the pair-wise temporary key.

Further to this end, for the mobile station to perform the handover from the second wireless network to the first wireless network, a handshake method for use in the mobile station comprises the following steps of: (a) transmitting the master session key and a notification signal to the base station so that the base station can transmit the master session key and the notification signal to the gateway apparatus to make the gateway apparatus transmit the master session key to the access point via the IP security tunnel after the gateway apparatus receives the notification signal; (b) transmitting an association request signal to the access point; (c) receiving an association response signal from the access point after the transmission of the association request signal; (d) generating a pair-wise temporary key according to the master session key; and (e) performing the handshake with the access point with the pair-wise temporary key.

Further to this end, for the mobile station to perform the handover from the second wireless network to the first wireless network, the access point comprises a transmission/receiving module, a process module, and a storage module. The transmission/receiving module is configured to build an IP security tunnel between the access point and the gateway apparatus and receive the master session key from the gateway apparatus via the IP security tunnel. The process module is configured to generate a pair-wise temporary key according to the master session key. The storage module is configured to store the master session key. The transmission/receiving module is further configured to receive an association request signal from the mobile station after receiving the master session key, transmit a association response signal to the mobile station after the receipt of the association request signal, and perform the handshake with the mobile station with the pair-wise temporary key.

Fur to this end, for the mobile station to perform the handover form the second wireless network to the first wireless network, a handshake method for use in the access point comprises the following steps of: building an IP security tunnel between the access point and the gateway apparatus; receiving the master session key from the gateway apparatus via the IP security tunnel; generating a pair-wise temporary key according to the master session key; receiving an association request signal from the mobile station after receiving the master session key; transmitting an association response signal to the mobile station after receiving the association request signal; and performing the handshake with the mobile station with the pair-wise temporary key.

Further to this end, for the mobile station to perform the handover from second wireless network to the first wireless network, the gateway apparatus comprises a transmission/receiving module. The transmission/receiving module is configured to build an IP security tunnel between the access point and the gateway apparatus, receive the master session key and the notification signal from the mobile station via the base station, and transmit the master session key to the access point via the IP security tunnel after receiving the notification signal so that the access point generates a pair-wise temporary key according to the master session key to perform the handshake with the mobile station.

Further to this end, for the mobile station to perform the handover from the second wireless network to the first wireless network, a handshake method for use in the gateway apparatus comprises the following steps of: building an IP security tunnel between the access point and the gateway apparatus; receiving the master session key and a notification signal from the mobile station via the base station; and transmitting the master session key to the access point via the IP security tunnel after receiving the notification signal so that the access point can generate a pair-wise temporary key according to the master session key to perform the handshake with the mobile station.

Furthermore to this end, for the mobile station to perform the handover from the second wireless network to the first wireless network, the base station comprises a transmission/receiving module. The transmission/receiving module is configured to receive the master session key and a notification signal from the mobile station, and transmit the master session key and the notification signal to the gateway apparatus so that the gateway apparatus transmits the master session key to the access point via the IP security tunnel after receiving the notification signal to make the access point generate a pair-wise temporary key according to the master session key to perform the handshake with the mobile station.

Further to this end, for the mobile station to perform the handover form the second wireless to the first wireless network, the handshake method for use in the base station comprises the following steps of: receiving the master session key from the mobile station; receiving a notification signal from the mobile station; and transmitting the notification signal and the master session key to the gateway apparatus so that the gateway apparatus transmits the master session key to the access point via the IP security tunnel after receiving the notification signal to make the access point generate a pair-wise temporary key according to the master session key to perform the handshake with the mobile station.

According to the above descriptions, when the mobile station of this invention performs the handover from the current wireless network to a next wireless network, the mobile station only needs to transmit a master session key, which is generated when it is authenticated in the current wireless network, to a gateway apparatus of the next wireless network instead of being subjected to the authentication procedure of the next wireless network. This effectively reduces the authentication time needed when the mobile station (client) is handovered to the next wireless network, thereby overcoming the drawbacks of the prior art.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the invention will be explained with reference to the embodiments thereof. However, the description of these embodiments is only for purposes of illustration rather than limitation. It should be noted that in the following embodiments and the attached drawings, elements unrelated to this invention are omitted from depiction; and dimensional relationships among individual elements in the attached drawings are illustrated only for ease of understanding and not for limiting the actual scale.

For purposes of description, all mobile stations set forth in the following embodiments are for use in a wireless network framework comprising a first wireless network and a second wireless network. The first wireless network is a WiFi wireless network based on the IEEE 802.11 standard, while the second wireless network is a WiMAX wireless network based on the IEEE 802.16 standard. Furthermore, an access point incorporated in the first wireless network is based on the IEEE 802.11 standard, while a gateway apparatus and a base station incorporated in the second wireless network are based on the IEEE 802.16 standard.

Figure 1:
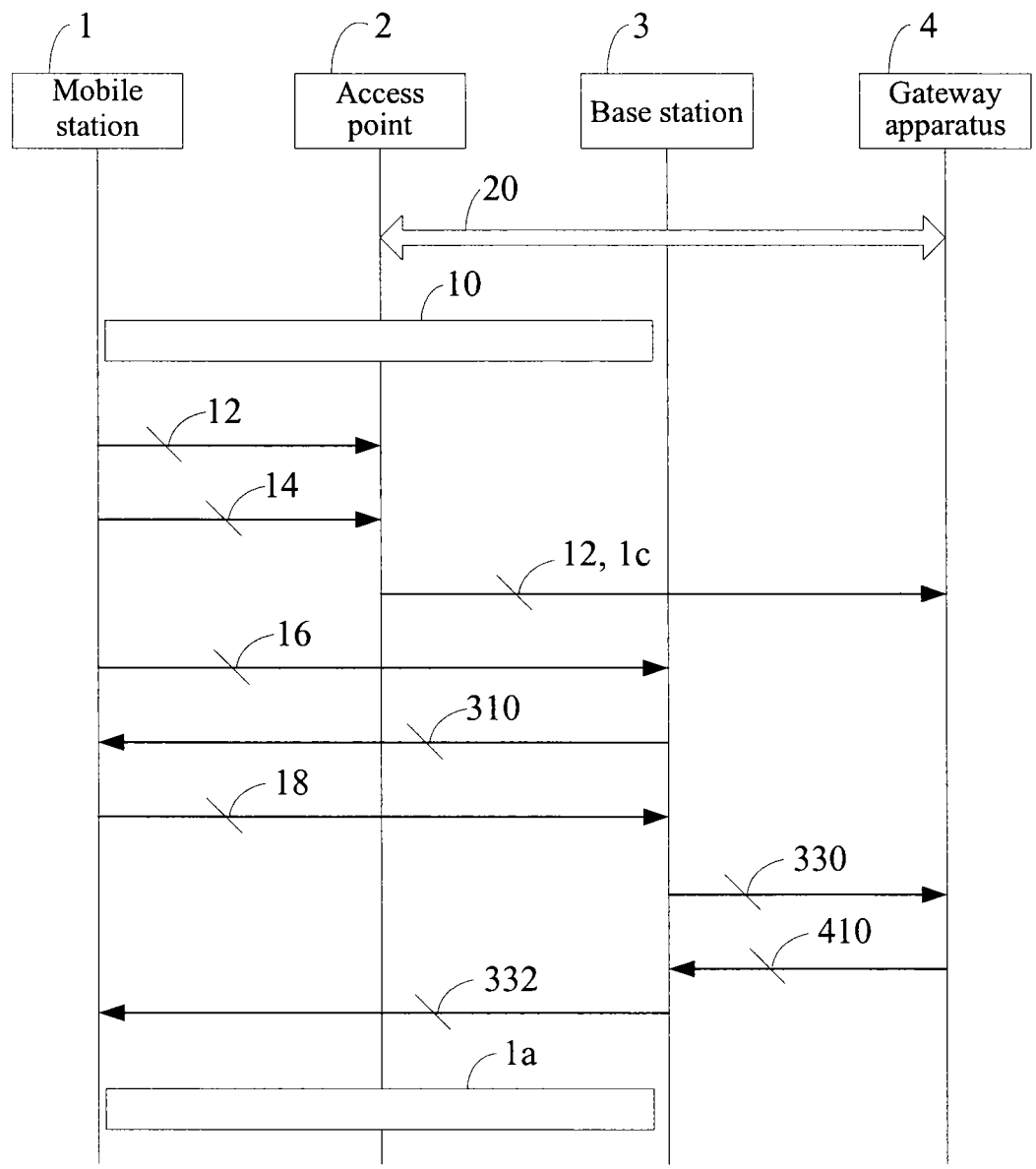
FIG. 1 is a schematic view of a wireless network framework according to a first embodiment of this invention.

A first embodiment of this invention is depicted in FIG. 1, which is a schematic view of a mobile station 1 performing a handover over from the WiFi wireless network to the WiMAX wireless network. The WiFi wireless network comprises an access point 2, while the WiMAX wireless network comprises a base station 3 and a gateway apparatus 4. To explicitly define the environment in which this embodiment is implemented, it is assumed that the mobile station 1 has passed the authentication procedure of the WiFi wireless network and is now served by the access point 2 of the WiFi wireless network; the mobile station 1 stores an identification 1c of the mobile station 1 and a master session key 12 generated when the mobile station 1 is authenticated in the WiFi wireless network; and the mobile station 1 further generates an authorization key according to the master session key 12 and the identification 1c of the mobile station 1, all of which are based on the IEEE 802.11 standard and thus will not be further described herein. In addition, an Internet Protocol (IP) security tunnel 20 has been built between the access point 2 of the WiFi wireless network and the gateway apparatus 4 of the WiMAX wireless network according to the IP security encryption protocol, which may be accomplished by the prior art and thus will not be further described herein.

In the following descriptions, the mobile station 1 is assumed to be gradually moving away from the coverage of the access point 2 and has now entered the coverage of the base station 3. For the mobile station 1, the signal strength of the access point 2 is fading away while that of the base station 3 becomes gradually stronger. Hence, to maintain a certain quality of service of the wireless networks, the mobile station 1 will execute a signal strength detection procedure 10 according to the IEEE 802.21 standard to determine whether a signal strength between the mobile station 1 and the access point 2 is lower than a predetermined level and whether a signal strength between the mobile station 1 and the base station 3 is not lower than the predetermined level. If the signal strength between the mobile station 1 and the access point 2 is not lower than the predetermined level but the signal strength between the mobile station 1 and the base station 3 is lower, the mobile station 1 will continue to be served by the access point 2 instead of performing the handover to the base station 3.

On the other hand, if the signal strength between the mobile station 1 and the access point 2 is lower than the predetermined level but the signal strength between the mobile station 1 and the base station 3 is not lower, the mobile station 1 will perform the handover from access point 2 to the base station 3 to be served by the base station 3. In other words, to maintain a certain quality of service of the wireless networks, the mobile station 1 will perform the handover from the WiFi wireless network to the WiMAX wireless network to be served by the WiMAX wireless network. To ensure a successful and quick handover of the mobile station 1 from the WiFi wireless network to the WiMAX wireless network, a handshake procedure will be performed among the mobile station 1, the access point 2, the base station 3, and the gateway apparatus 4 as follows so that the mobile station 1 can perform the handover to the WiMAX wireless network without significantly altering the existing wireless network framework.

Because the mobile station 1 is now still operating within the coverage of and served by the access point 2 and has not been handed over to the base station 3 yet, the access point 2 has the identification 1c of the mobile station 1 stored therein. To perform the handover to the WiMAX wireless network, the mobile station 1 transmits the master session key 12 and a notification signal 14 to the access point 2. The access point 2 stores the master session key 12 it receives. The access point 2 also receives the notification signal 14 and, and transmits the master session key 12 and the identification 1c to the gateway apparatus 4 via the IP security tunnel 20 after receiving the notification signal 14 so that the gateway apparatus 4 will receive the master session key 12 and the identification 1c from the access point 2 via the IP security tunnel 20.

To measure a distance from the base station 3, the mobile station 1 further transmits a ranging request signal 16 to the base station 3. After receiving the ranging request signal 16 from the mobile station 1, the base station 3 transmits a ranging response signal 310 to the mobile station 1 so that the mobile station 1 can be informed of the distance from the base station 3. After receiving the ranging response signal 310, the mobile station 1 further transmits a subscriber station basic capability request signal 18 to the base station 3 which, after receiving the subscriber station basic capability request signal 18, in turn transmits a mobile station preattachment request signal 330 to the gateway apparatus 4.

The gateway apparatus 4 receives the mobile station preattachment request signal 330 from the base station 3 and generates and transmits a mobile station preattachment response signal 410 comprising the authorization key to the base station 3 after receiving the mobile station preattachment request signal 330. According to the authorization key comprised in the mobile station preattachment response signal 410 it receives, the base station 3 generates and transmits a subscriber station basic capability response signal 332 to the mobile station 1. Upon receiving the subscriber station basic capability response signal 332, the mobile station 1 uses the previously generated authorization key to perform the 3-way handshake conforming to the 802.16 standard with the base station 3 so that the mobile station 1 can perform the handover to the WiMAX wireless network via the base station 3.

Figure 2:
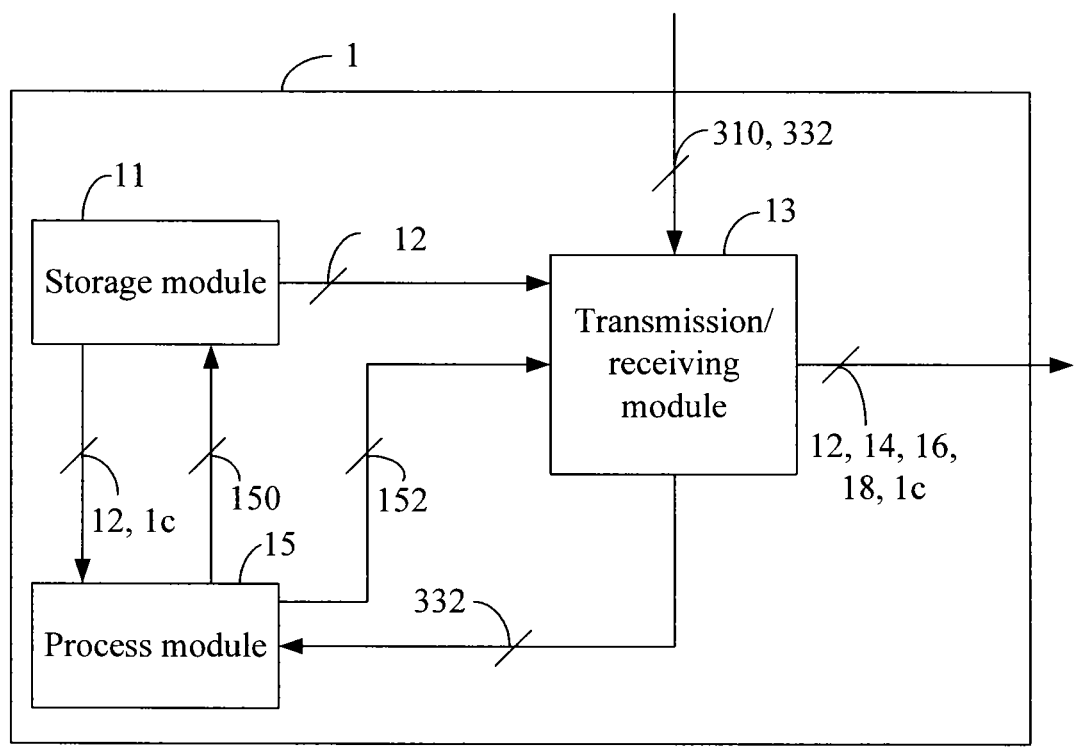
FIG. 2 is a schematic view of a mobile station according to the first embodiment of this invention.

FIG. 2 illustrates a schematic view of the mobile station 1. The mobile station 1 comprises a storage module 11, a transmission/receiving module 13, and a process module 15. The storage module 11 is configured to store the identification 1c of the mobile station 1 and the master session key 12 generated when the mobile station 1 is authenticated in the WiFi wireless network. The process module 15 is configured to execute a signal strength detection procedure 10 to determine whether the signal strength between the mobile station 1 and the access point 2 is lower than the predetermined level and whether the signal strength between the mobile station 1 and the base station 3 is not lower than the predetermined level. If the process module 15 determines that the signal strength between the mobile station 1 and the access point 2 is not lower than the predetermined level but the signal strength between the mobile station 1 and the base station 3 is lower, the mobile station 1 will continue to be served by the access point 2 instead of being handed over to the base station 3.

On the other hand, if the process module 15 determines that the signal strength between the mobile station 1 and the access point 2 is lower than the predetermined level but the signal strength between the mobile station 1 and the base station 3 is not lower, the process module 15 will further generate an authorization key 150 according to the identification 1c and the master session key 12. The authorization key 150 is then stored by the storage module 11. The functionality of the authorization key 150 is well known to those skilled in the art and thus will not be further described herein. According to the determination results 152, the transmission/receiving module 13 transmits the master session key 12 and the notification signal 14 to the access point 2 which, after receiving the notification signal 14, further transmits the master session key 12 and the identification 1c to the gateway apparatus 14 via the IP security tunnel 20.

Figure 3:
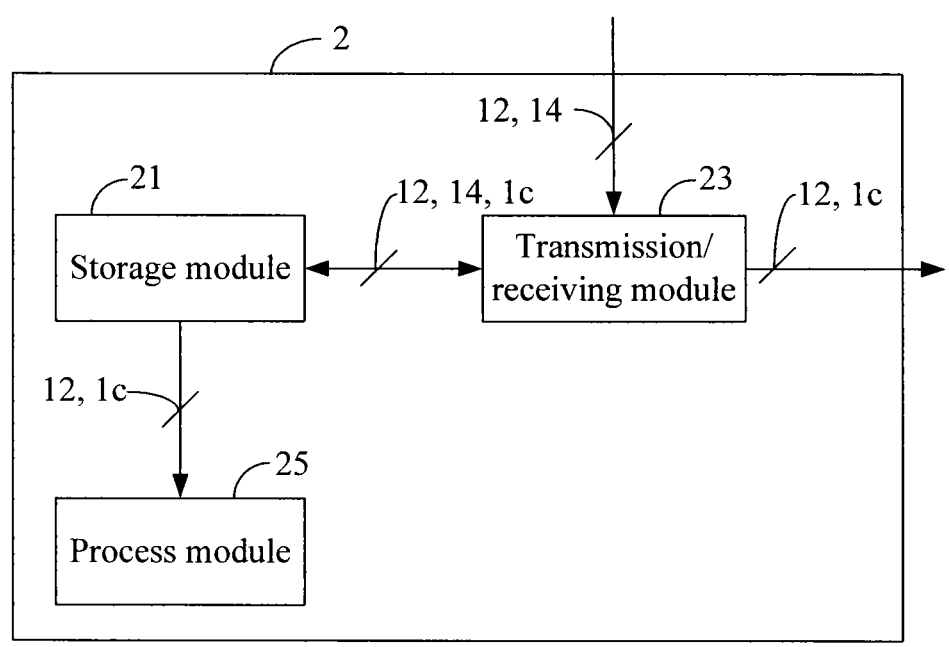
FIG. 3 is a schematic view of an access point according to the first embodiment of this invention.

FIG. 3 illustrates a schematic view of the access point 2. The access point 2 comprises a storage module 21, a transmission/receiving module 23, and a process module 25. It should be noted that the functions and actions of the process module 25 will be described in other embodiments and is omitted from description in this embodiment. The transmission/receiving module 23 is configured to build an IP security tunnel 20 between the access point 2 and the gateway apparatus 4 according to the IP security encryption protocol. It should be noted that, rather than being limited thereto, the IP security tunnel 20 may also be built in response to an active request from the gateway apparatus 4.

The transmission/receiving module 23 is configured to receive the master session key 12 from the mobile station 1. The storage module 21 is configured to store the identification 1c of the mobile station 1 and the master session key 12 when it is received. It should be noted that the mobile station 1 is now served by the access point 2, so the identification 1c of the mobile station 1 has been stored in the storage module 21 prior to the handover of the mobile station 1. Hence, it is unnecessary for the mobile station 1 to transmit the identification 1c thereof to the access point 2 for handover purposes. The transmission/receiving module 23 is further configured to receive the notification signal 14 from the mobile station 1, from which the access point 2 will learn that the mobile station 1 is to perform the handover to the WiMAX wireless network. Accordingly, the transmission/receiving module 23, after receiving the notification signal 14, further transmits the master session key 12 and the identification 1c of the mobile station 1 to the gateway apparatus 4 via the IP security tunnel 20. According to the master session key 12 and the identification 1c, the gateway apparatus 4 then generates an authorization key 150 for use by the base station 3 and the mobile station 1 to perform the handshake.

Figure 4:
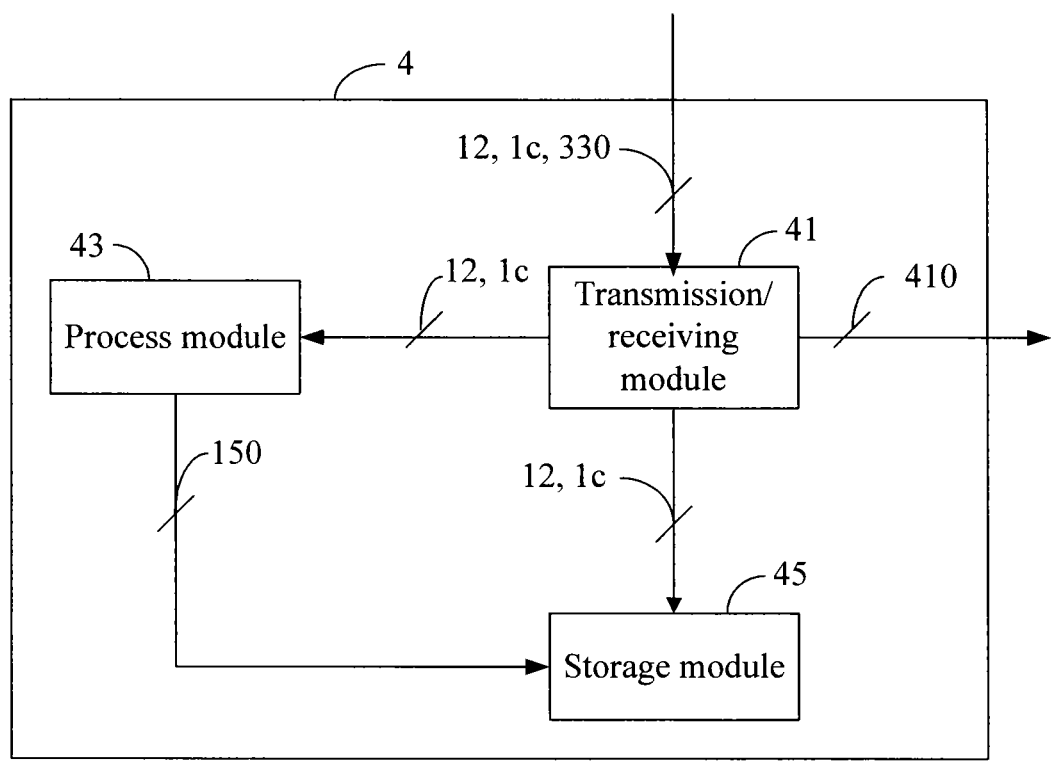
FIG. 4 is a schematic view of a gateway apparatus according to the first embodiment of this invention.

FIG. 4 illustrates a schematic view of the gateway apparatus 4. The gateway apparatus 4 comprises a transmission/receiving module 41, a process module 43 and a storage module 45. The transmission/receiving module 41 is configured to build the IP security tunnel 20 between the access point 2 and the gateway apparatus 4. After the IP security tunnel 20 is built, the transmission/receiving module 41 is further configured to receive the master session key 12 and the identification 1c of the mobile station 1 from the access point 2 via the IP security tunnel 20. The process module 43 is configured to generate the authorization key 150 according to the master session key 12 and the identification 1c of the mobile station 1. The storage module 45 is configured to store the master session key 12, the identification 1c of the mobile station 1 and the authorization key 150.

Figure 5:
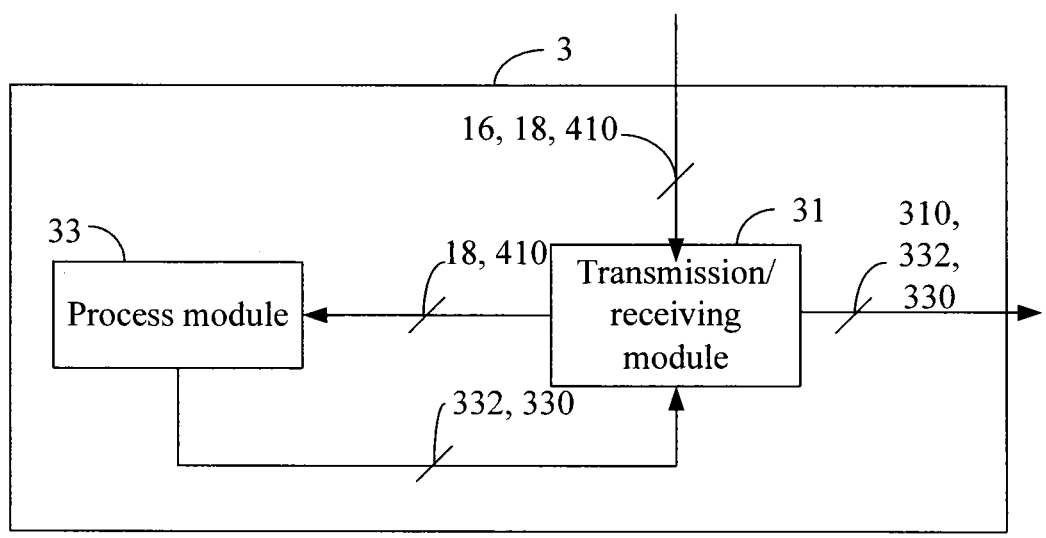
FIG. 5 is a schematic view of a base station according to the first embodiment of this invention.

In referring to FIG. 2, once the master session key 12 and the identification 1c of the mobile station 1 is received by the gateway apparatus 4, the mobile station 1 can communicate with the base station 3 directly. To measure the distance from the base station 3, the transmission/receiving module 13 of the mobile station 1 is further configured to transmit a ranging request signal 16 to the base station 3. To illustrate the operations of the base station 3 receiving the ranging request signal 16, FIG. 5 illustrates a schematic view of the base station 3. The base station 3 comprises a transmission/receiving module 31 and a process module 33. The transmission/receiving module 31 is configured to receive the ranging request signal 16 from the mobile station 1 and transmit a ranging response signal 310 to the mobile station 1 after the receipt of the ranging request signal 16. It should be noted that the functionalities of the ranging request signal 16 and the ranging response signal 310 have been defined in the IEEE 802.16 standard and thus will not be further described herein.

In reference to FIG. 2, the transmission/receiving module 13 of the mobile station 1 is further configured to receive the ranging response signal 310 from the base station 3 and transmit the subscriber station basic capability request signal 18 to the base station 3 according to the ranging response signal 310. To prevent the WiMAX wireless network from running its authentication mechanism, the subscriber station basic capability request signal 18 has an authentication-related field thereof set to a value that deactivates the authentication. In reference to FIG. 5, the transmission/receiving module 31 of the base station 3 is further configured to receive the subscriber station basic capability request signal 18 so that the process module 33 will generate the mobile station preattachment request signal 330 according to the subscriber station basic capability request signal 18. The transmission/receiving module 31 of the base station 3 is also configured to transmit the mobile station preattachment request signal 330 to the gateway apparatus 4. In reference to FIG. 4, after receiving the mobile station preattachment request signal 330, the transmission/receiving module 41 of the gateway apparatus 4 further transmits a mobile station preattachment response signal 410 comprising the authorization key 150 to the base station 3.

After the transmission/receiving module 31 of the base station 3 receives the mobile station preattachment response signal 410, the process module 33 of the base station 3 generates a subscriber station basic capability response signal 332 according to the authorization key 150 comprised in the mobile station preattachment response signal 410. The transmission/receiving module 31 of the base station 3 is further configured to transmit the subscriber station basic capability response signal 332 to the mobile station 1. After the subscriber station basic capability response signal 332 is received by the transmission/receiving module 13 of the mobile station 1, the process module 15 decrypts the subscriber station basic capability response signal 332 according to the authorization key 150 generated by the process module 15 itself and performs a 3way handshake 1$a$ conforming to the IEEE 802.16 standard with the base station 3 by using the decrypted subscriber station basic capability response signal 332 and the authorization key 150 so that the mobile station 1 performs the handover to the WiMAX wireless network via the base station 3.

Figure 6:
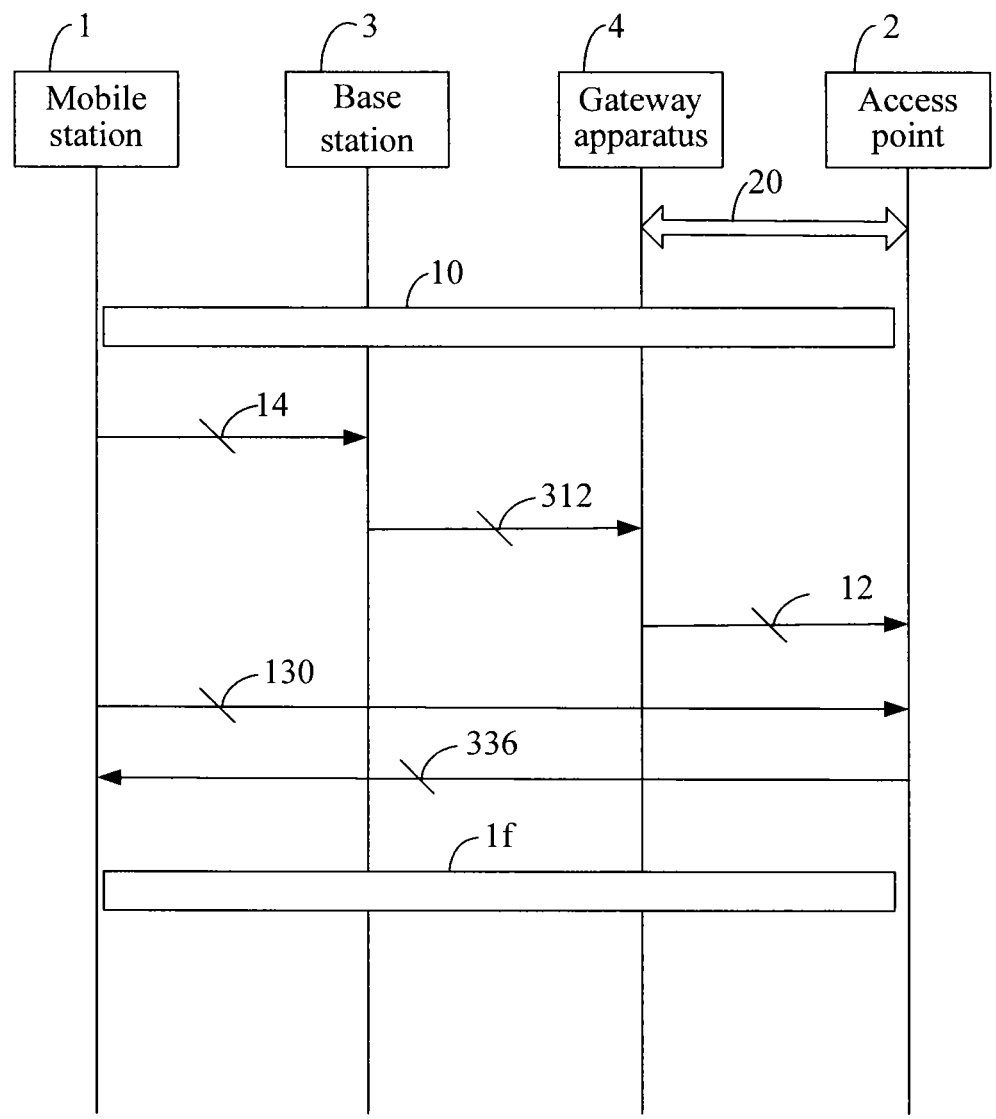
FIG. 6 is a schematic view of a wireless network framework according to a second embodiment of this invention.

The second embodiment of this invention is depicted in FIG. 6, which is a schematic view of a mobile station 1 being handed over from the WiMAX wireless network to the WiFi wireless network. The WiFi wireless network comprises an access point 2, while the WiMAX wireless network comprises a base station 3 and a gateway apparatus 4. To explicitly define the environment in which this embodiment is implemented, it is assumed that the mobile station 1 has passed the authentication procedure of the WiMAX wireless network and is now served by the base station 3 and the gateway apparatus 4 of the WiMAX wireless network; and the mobile station 1 stores a master session key 12 generated when the mobile station 1 is authenticated in the WiMAX wireless network, all of which are based on the IEEE 802.16 standard and thus will not be further described herein. An IP security tunnel 20 has been built between the access point 2 of the WiFi wireless network and the gateway apparatus 4 of the WiMAX wireless network according to the IP security encryption protocol, which may be accomplished by the prior art and thus will not be further described herein.

The following descriptions assume that the mobile station 1 is gradually moving away from the coverage of the base station 3 and has now entered the coverage of the access point 2. Hence, to maintain a certain quality of service of the wireless networks, the mobile station 1 will execute a signal strength detection procedure 10 according to the IEEE 802.21 standard to determine whether a signal strength between the mobile station 1 and the base station 3 is lower than a predetermined level and whether a signal strength between the mobile station 1 and the access point 2 is not lower than the predetermined level. If the signal strength between the mobile station 1 and the base station 3 is not lower than the predetermined level but the signal strength between the mobile station 1 and the access point 2 is lower, the mobile station 1 will continue to be served by the base station 3 instead of performing the handover to the access point 2.

On the other hand, if the signal strength between the mobile station 1 and the base station 3 is lower than the predetermined level but the signal strength between the mobile station 1 and the access point 2 is not lower, the mobile station 1 will perform the handover from base station 3 to the access point 2 to be served by the access point 2. In other words, to maintain a certain quality of service of the wireless networks, the mobile station 1 will perform the handover from the WiMAX wireless network to the WiFi wireless network to be served by the WiFi wireless network. To ensure that the handover of the mobile station 1 from the WiMAX wireless network to the WiFi wireless network is successful and quick, the handshake procedure will be performed among the mobile station 1, the access point 2, the base station 3 and the gateway apparatus 4 as follows so that the mobile station 1 can perform the handover to the WiFi wireless network without significantly altering the existing wireless network framework.

Because the mobile station 1 is now still operating within the coverage of and served by the base station 3 and has not performed the handover to the coverage of the access point 2 yet, the mobile station 1 transmits a notification signal 14 to the base station 3 and generates a pair-wise temporary key 154 according to the master session key 12. After receiving the notification signal 14, the base station 3 generates and transmits another notification signal 312 to the gateway apparatus 4 which, upon receiving the another notification signal 312, transmits the master session key 12 to the access point 2 via the IP security tunnel 20. Then the access point 2 receives the master session key 12 from the gateway apparatus 4 via the IP security tunnel 20.

After the access point 2 receives the master session key 12, the mobile station 1 can communicate with the access point 2 directly. The mobile station 1 transmits an association request signal 130 to the access point 2 which, after receiving the association request signal 130, transmits an association response signal 336 to the mobile station 1. The mobile station 1 that has received the association response signal 336 may then use the previously generated pair-wise temporary key 154 to perform the 4-way handshake 1$f$ conforming to the IEEE 802.11 standard with the access point 2 for the mobile station 1 to perform the handover to the WiFi wireless network via the access point 2.

Figure 7:
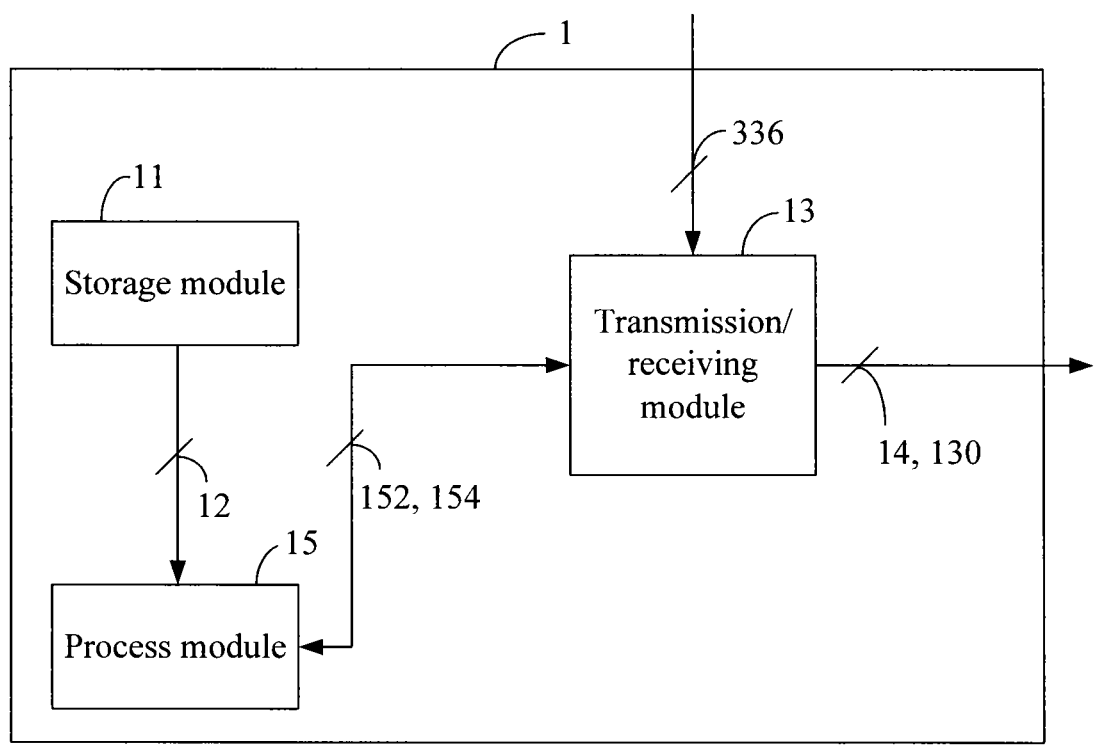
FIG. 7 is a schematic view of a mobile station according to the second embodiment of this invention.
Figure 8:
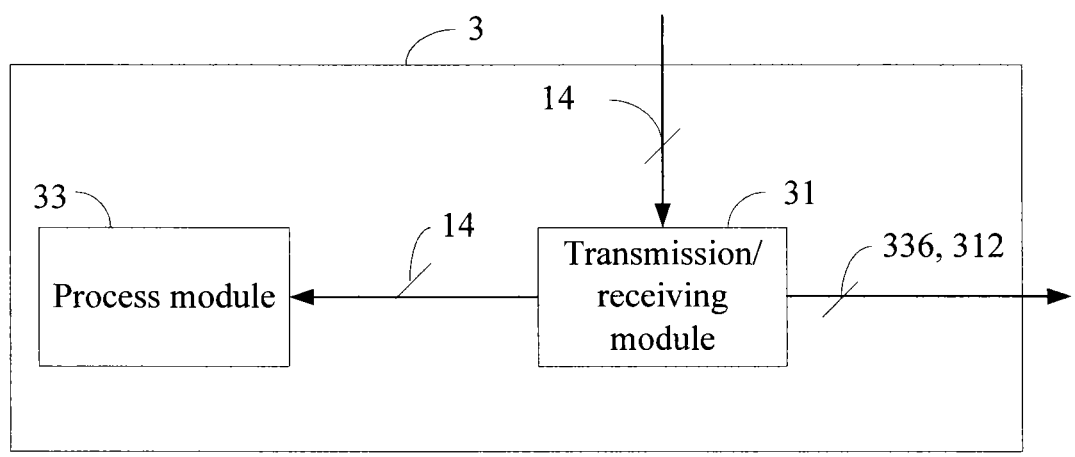
FIG. 8 is a schematic view of a base station according to the second embodiment of this invention.

FIG. 7 illustrates a schematic view of the mobile station 1. The mobile station 1 comprises a storage module 11, a transmission/receiving module 13 and a process module 15. The storage module 11 is configured to store the master session key 12. The transmission/receiving module 13 is configured to transmit a notification signal 14 to the base station 3 so that the base station 3 transmits another notification signal 312 to the gateway apparatus 4. FIG. 8 illustrates a schematic view of the base station 3. The base station 3 comprises a transmission/receiving module 31 and a process module 33. It should be noted that the functionalities of the process module 33 have already been described in the first embodiment, and only the transmission/receiving module 31 to be used in this embodiment will be described herein. The transmission/receiving module 31 is configured to receive the notification signal 14 from the mobile station 1 and generate and transmit another notification signal 312 to the gateway apparatus 4 after the receipt of the notification 14. After receiving the another notification signal 312, the gateway apparatus 4 transmits the master session key 12 to the access point 2 via the IP security tunnel 20.

Figure 9:
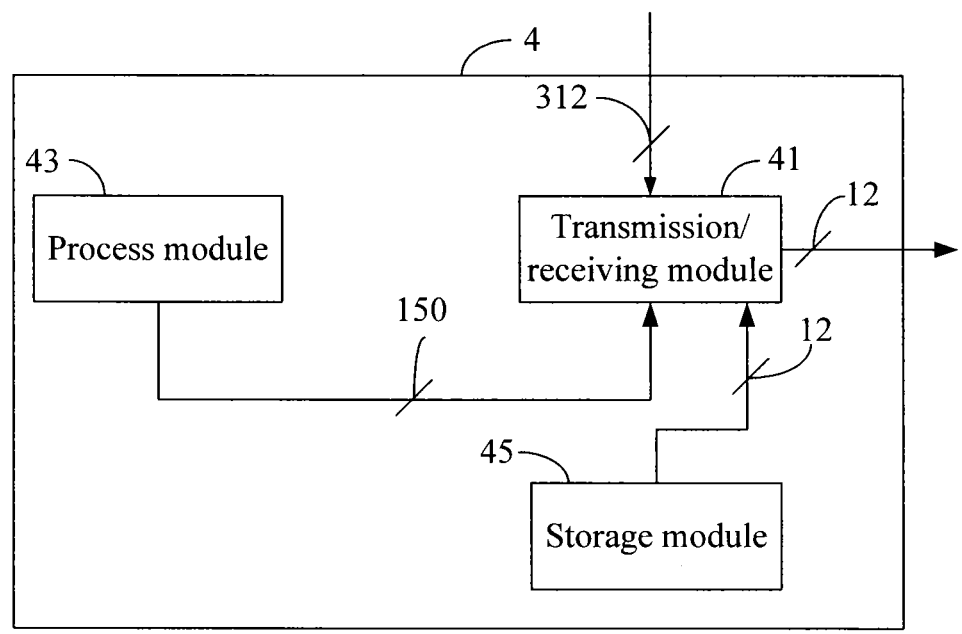
FIG. 9 is a schematic view of a gateway apparatus according to the second embodiment of this invention.

FIG. 9 illustrates a schematic view of the gateway apparatus 4. The gateway apparatus 4 comprises a transmission/receiving module 41, a process module 43 and a storage module 45. It should be noted that the functionalities of the process module 43 have already been described in the first embodiment, and only the transmission/receiving module 41 and the storage module 45 to be used in this embodiment will be described herein. The transmission/receiving module 41 is configured to build the IP security tunnel 20 between the access point 2 and the gateway apparatus 4. The transmission/receiving module 41 is further configured to receive the notification signal 312 via the base station 3 and transmit the master session key 12 of the gateway apparatus 4 to the access point 2 via the IP security tunnel 20 after the receipt of the notification signal 312 so that the access point 2 can generate the pair-wise temporary key 154 according to the master session key 12 to perform the handshake with the mobile station 1. Here, the gateway apparatus 4 communicates with the base station 3 according to the IEEE 802.16 standard.

Figure 10:
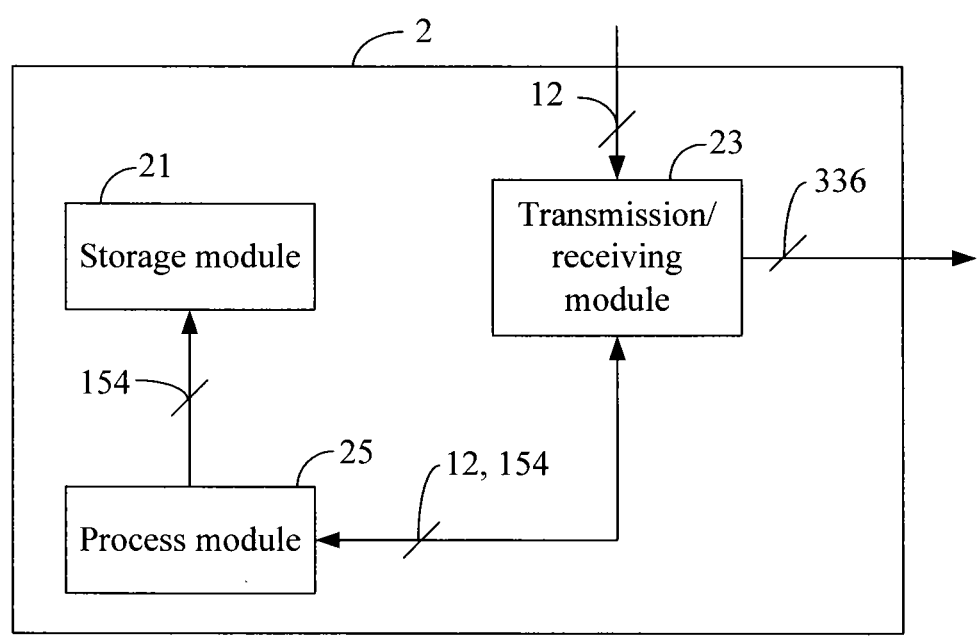
FIG. 10 is a schematic view of an access point according to the second embodiment of this invention.

FIG. 10 illustrates a schematic view of the access point 2. The access point 2 comprises a storage module 21, a transmission/receiving module 23 and a process module 25. The transmission/receiving module 23 is configured to build the IP security tunnel 20 between the access point 2 and the gateway apparatus 4 and receive the master session key 12 from the gateway apparatus 4 via the IP security tunnel 20. The process module 25 is configured to generate the pair-wise temporary key 154 according to the master session key 12. The storage module 21 is configured to store the master session key 12 and the pair-wise temporary key 154. In reference to FIG. 7, the transmission/receiving module 13 of the mobile station 1 is further configured to transmit an association request signal 130 to the access point 2. The transmission/receiving module 23 of the access point 2 is further configured to receive the association request signal 130 transmitted from the mobile station 1 after receiving the master session key 12 and transmit an association response signal 336 to the mobile station 1 after the receipt of the association request signal 130 to perform the handshake if with the mobile station 1 by using a pair-wise temporary key 250.

Figure 11A:
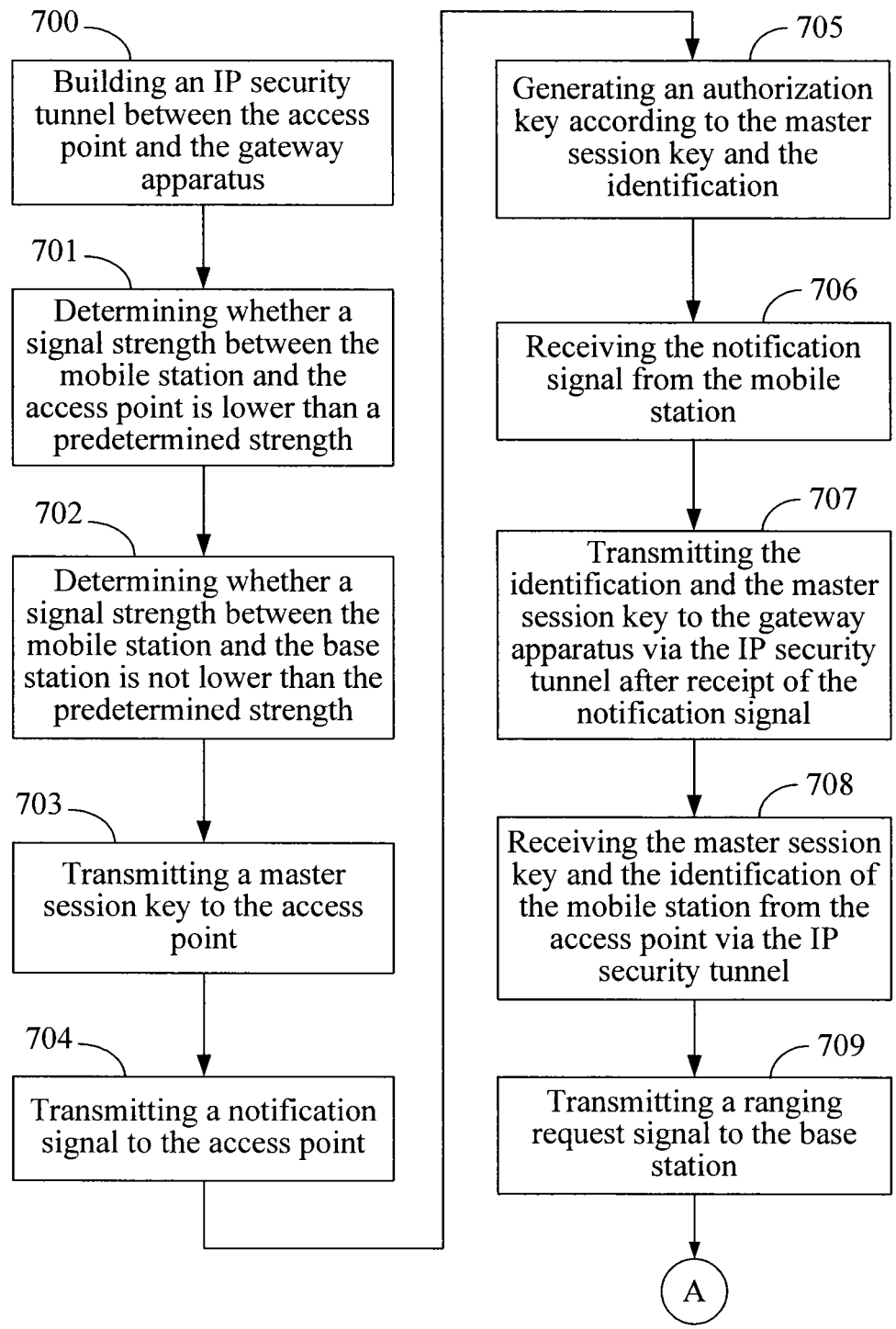
FIG 11A is a partial flowchart of a handshake method according to a third embodiment of this invention.
Figure 11B:
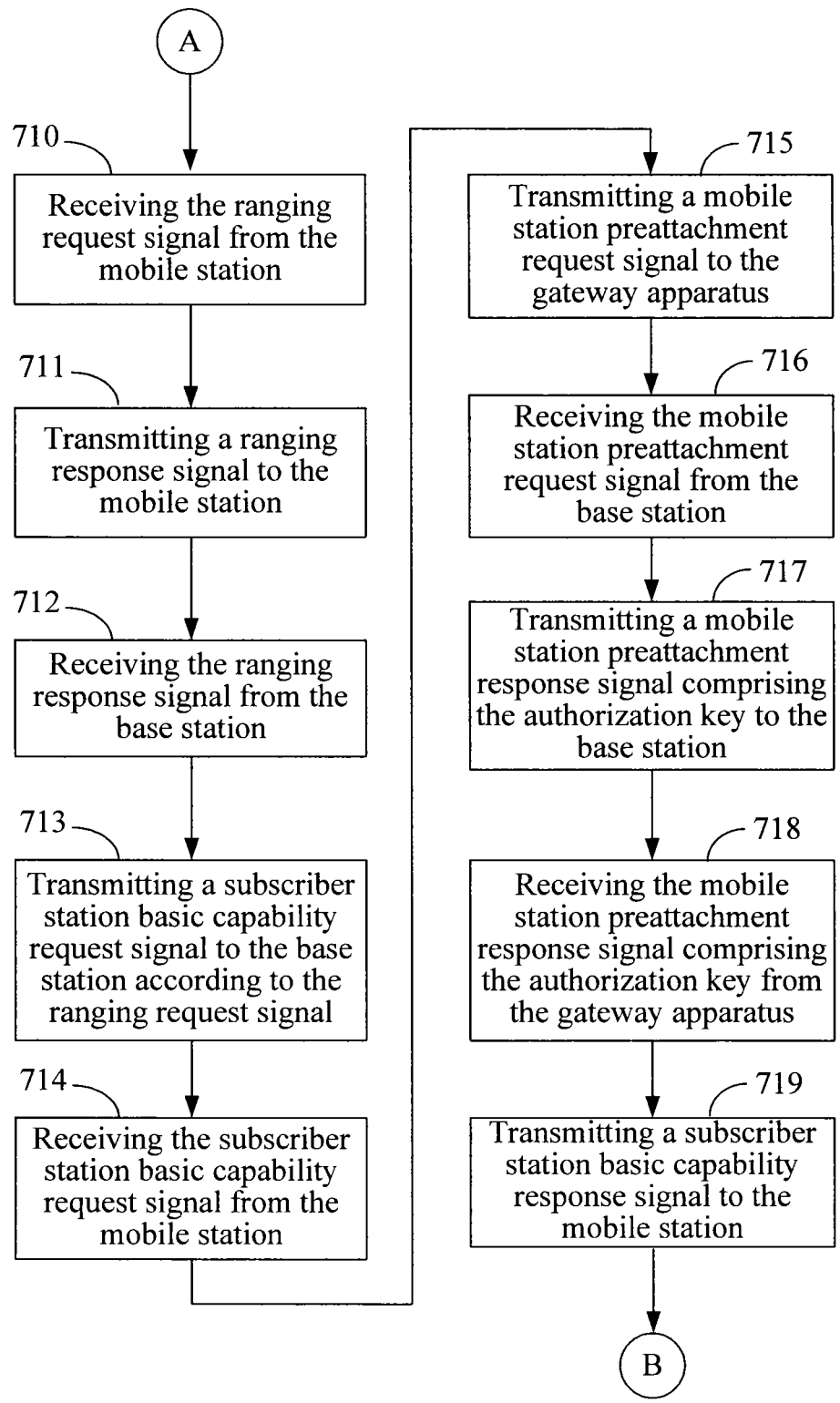
FIG. 11B is another partial flowchart of the handshake method according to the third embodiment of this invention.
Figure 11C:
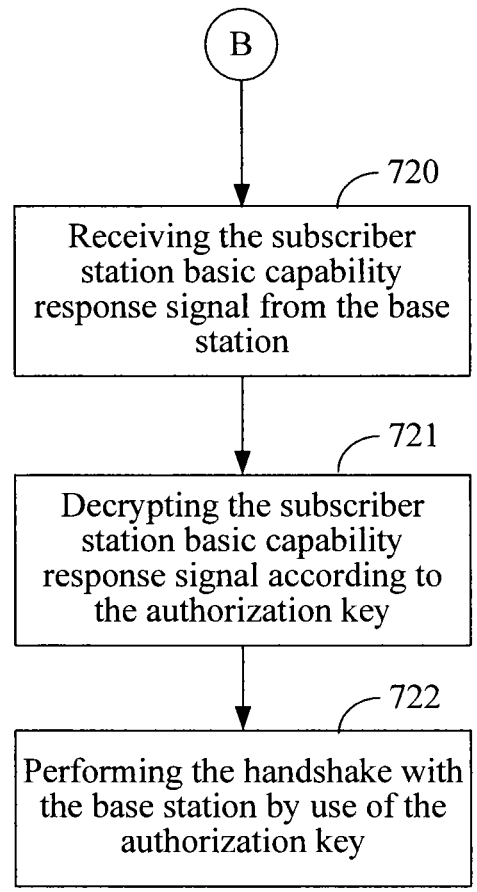
FIG. 11C is a further partial flowchart of the handshake method according to the third embodiment of this invention.

The third embodiment of this invention is depicted in FIGS. 11A to 11C, which together illustrate a flowchart of a handshake method for use in the wireless network framework of the first embodiment. First, in reference to FIG. 11A, step 700 is executed to build an IP security tunnel between the access point and the gateway apparatus. Afterwards, step 701 is executed to determine whether the signal strength between the mobile station and the access point is lower than a predetermined strength, and step 702 is executed to determine whether the signal strength between the mobile station and the base station is not lower than the predetermined strength. Afterwards, step 703 is executed to transmit a master session key to the access point.

Next, step 704 is executed to transmit a notification signal to the access point. Step 705 is executed to generate an authorization key according to the master session key and the identification. Step 706 is executed to receive the notification signal from the mobile station, and step 707 is executed to transmit the identification and the master session key to the gateway apparatus via the IP security tunnel after the receipt of the notification signal. Then step 708 is executed to receive the master session key and the identification of the mobile station from the access point via the IP security tunnel, and step 709 is executed to transmit a ranging request signal to the base station. In reference to FIG. 11B, step 710 is then executed to receive the ranging request signal from the mobile station, and step 711 is executed to transmit a ranging response signal to the mobile station.

Thereafter, step 712 is executed to receive the ranging response signal from the base station. Step 713 is executed to transmit a subscriber station basic capability request signal to the base station according to the ranging request signal. Next, step 714 is executed to receive the subscriber station basic capability request signal from the mobile station, and step 715 is executed to transmit a mobile station preattachment request signal to the gateway apparatus. Subsequently, step 716 is executed to receive the mobile station preattachment request signal from the base station, and step 717 is executed to transmit a mobile station preattachment response signal comprising the authorization key to the base station after receiving the mobile station preattachment request signal.

Then, step 718 is executed to receive the mobile station preattachment response signal comprising the authorization key from the gateway apparatus, and step 719 is executed to transmit a subscriber station basic capability response signal to the mobile station. In reference to FIG. 11C, step 720 is then executed to receive the subscriber station basic capability response signal from the base station, and step 721 is executed to decrypt the subscriber station basic capability response signal according to the authorization key. Finally, step 722 is executed to perform the handshake with the base station by using the authorization key.

In addition to the aforesaid steps, the third embodiment can also execute all the functions and operations set forth in the first embodiment. The methods with which the third embodiment executes these functions and operations will be readily appreciated by those skilled in the art based on the explanation of the first embodiment, and thus will not be further described herein.

Figure 12A:
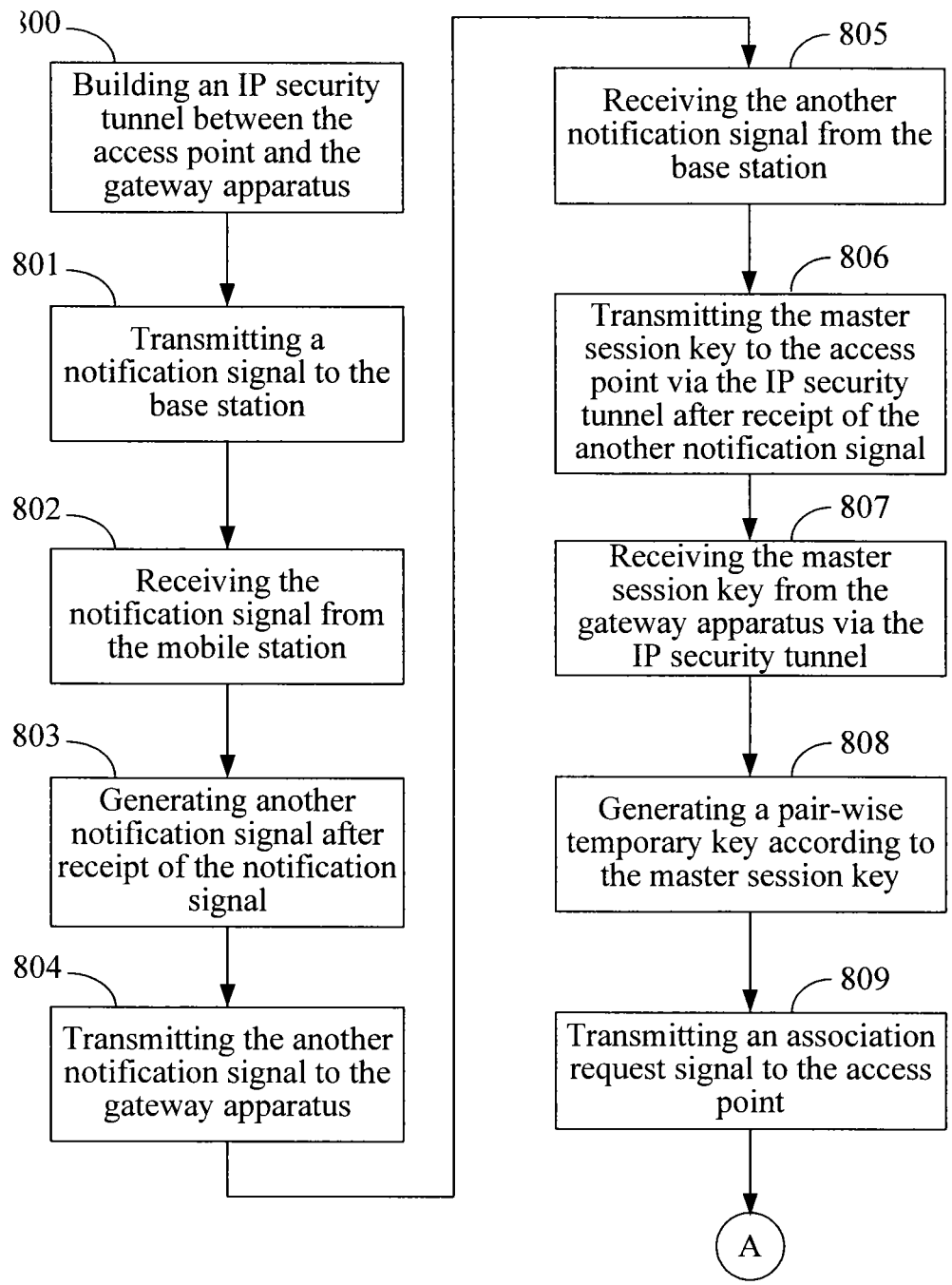
FIG. 12A is a partial flowchart of a handshake method according to a fourth embodiment of this invention.
Figure 12B:
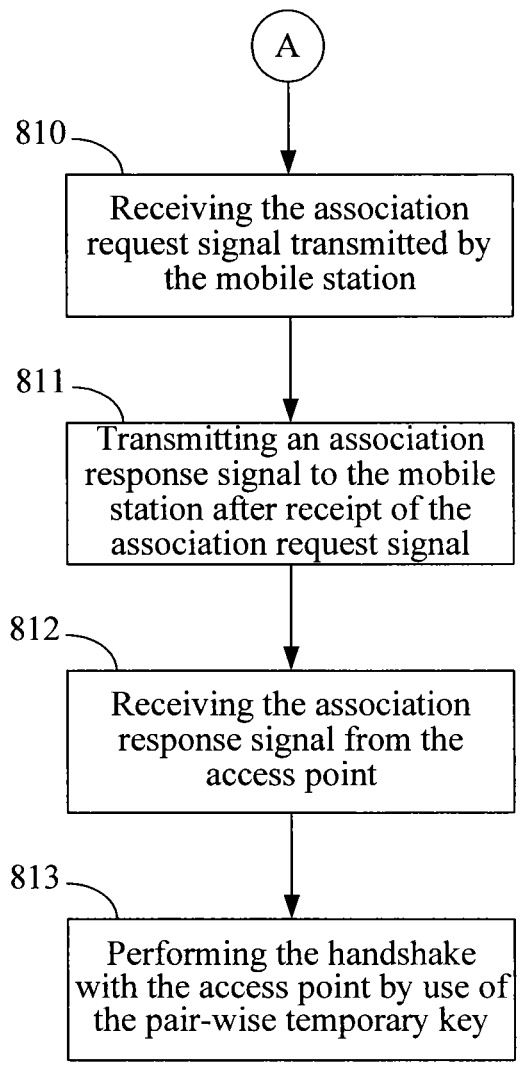
FIG. 12B is another partial flowchart of the handshake method according to the fourth embodiment of this invention.

The fourth embodiment of this invention is depicted in FIGS. 12A to 12B, which together illustrate a flowchart of a handshake method for use in the wireless network framework of the second embodiment. First, in reference to FIG. 12A, step 800 is executed to build an IP security tunnel between the access point and the gateway apparatus. Afterwards, step 801 is executed to transmit a notification signal to the base station, and step 802 is executed to receive the notification signal from the mobile station. Step 803 is executed to generate another notification signal after receiving the notification signal. Then, step 804 is executed to transmit the another notification signal to the gateway apparatus, and step 805 is executed to receive the another notification signal from the base station. Thereafter, step 806 is executed to transmit a master session key to the access point via the IP security tunnel after receiving another notification signal. Step 807 is executed to receive the master session key from the gateway apparatus via the IP security tunnel. Step 808 is executed to generate a pair-wise temporary key according to the master session key. Subsequently, step 809 is executed to transmit an association request signal to the access point.

Next, in reference to FIG. 12B, step 810 is executed to receive the association request signal transmitted by the mobile station, and step 811 is executed to transmit an association response signal to the mobile station after receiving the association request signal. Next, step 812 is executed to receive the association response signal from the access point. Finally, step 813 is executed to perform the handshake with the access point by using the pair-wise temporary key.

In addition to the aforesaid steps, the fourth embodiment can also execute all the functions and operations set forth in the second embodiment. The methods with which the fourth embodiment executes these functions and operations will be readily appreciated by those skilled in the art based on the explanation of the second embodiment, and thus will not be further described herein.

According to the above descriptions, when the mobile station of this invention is to perform the handover from the current wireless network to the next wireless network, the mobile station only needs to transmit a master session key, which is generated when it is authenticated in the current wireless network, to a gateway apparatus of the next wireless network instead of being subjected anew to the authentication procedure of the next wireless network. This effectively reduces the authentication time needed when the mobile station (client) is handed over to the next wireless network, thereby overcoming the drawback of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile station for use in a wireless network framework, the wireless network framework comprising a first wireless network and a second wireless network, the first wireless network comprising an access point, the second wireless network comprising a gateway apparatus and a base station, an IP security tunnel existing between the access point and the gateway apparatus, the access point storing an identification of the mobile station, the mobile station comprising:
   a storage module, being configured to store a master session key and the identification;
   a transmission/receiving module, being configured to transmit the master session key and a notification signal to the access point so that the access point transmits the master session key and the identification to the gateway apparatus via the IP security tunnel after the access point receives the notification signal, transmit a subscriber station basic capability request signal to the base station, and receive a subscriber station basic capability response signal from the base station after the transmission of the subscriber station basic capability request signal; and
   a process module, being configured to generate an authorization key according to the master session key and the identification, decrypt the subscriber station basic capability response signal according to the authorization key, and perform a handshake with the base station with the authorization key.

2. The mobile station as claimed in claim 1, wherein the process module is further configured to determine that a signal strength between the mobile station and the access point is smaller than a predetermined signal strength, and determine that a signal strength between the mobile station and the base station is not smaller than the predetermined signal strength, and the transmission/receiving module transmits the notification signal to the access point according to the determination results.

3. The mobile station as claimed in claim 1, wherein the transmission/receiving module is further configured to transmit a ranging request signal to the base station and receive a ranging response signal from the base station after the transmission of the ranging request signal, wherein the transmission/receiving module transmit the subscriber station basic capability request signal to the base station after the receipt the ranging response signal.

4. The mobile station as claimed in claim 1, wherein the mobile station communicates with access point based on the IEEE 802.11 standard, the mobile station communicates with the base station and the gateway apparatus based on the IEEE 802.16 standard, and the mobile station and the base station perform the 3-way handshake conforming to the 802.16 standard.

5. A handshake method for use in a mobile station in a wireless network. framework, the wireless network framework comprising a first wireless network and a second wireless network, the first wireless network comprising an access point, the second wireless network comprising a gateway apparatus and a base station, an IP security tunnel existing between the access point and the gateway apparatus, the access point storing an identification of the mobile station, the mobile station storing a master session key and the identification, the handshake method comprising the steps of:
   transmitting the master session key to the access point;
   transmitting a notification signal to the access point so that the access point transmits the master session key and the identification to the gateway apparatus via the IP security tunnel after the access point receives the notification signal;
   generating an authorization key according to the master session key and the identification;
   transmitting a subscriber station basic capability request signal to the base station;
   receiving a subscriber station basic capability response signal from the base station after the transmission of the subscriber station basic capability request signal;
   decrypting the subscriber station basic capability response signal according to the authorization key; and
   performing the handshake with the authorization key.

6. The handshake method as claimed in claim 5, further comprising the steps of:
   determining that a signal strength between the mobile station and the access point is smaller than a predetermined signal strength; and
   determining that a signal strength between the mobile station and the base station is not smaller than the predetermined signal strength;
   wherein the step of transmitting the notification signal to the access point is executed according to the determination results.

7. The handshake method as claimed in claim 5, further comprising the steps of:
   transmitting a ranging request signal to the base station; and
   receiving a ranging response signal from the base station after the transmission of the ranging request signal;
   wherein the step of transmitting a subscriber station basic capability request signal to the base station is executed after the receipt of the ranging response signal.

8. The handshake method as claimed in claim 5, wherein the mobile station communicates with the access point based on the IEEE 802.11 standard, the mobile station communicates with the base station and the gateway apparatus based on the IEEE 802.16 standard, and the mobile station and the base station perform the 3-way handshake conforming to the IEEE 802.16 standard.

9. An access point for use in a wireless network framework, the wireless network framework comprising a mobile station, a first wireless network, and a second wireless network, the first wireless network comprising the access point, the second wireless network comprising a gateway apparatus and a base station, the access point comprising:
   a storage module, being configured to store an identification and a master session key of the mobile station; and
   a transmission/receiving module, being configured to build an IP security tunnel between the access point and the gateway apparatus, receive a notification signal from the mobile station, transmit the identification and the master session key to the gateway apparatus via the IP security tunnel after the receipt of the notification signal so that the gateway apparatus generates an authorization key according to the master session key and the identification and transmits the authorization key to the base station so that the base station and the mobile station can perform the handshake with the authorization key.

10. The access point as claimed in claim 9, wherein the access point communicates with the mobile station based on the IEEE 802.11 standard.

11. A handshake method for use in an access point in a wireless network framework, the wireless network framework comprising a first wireless network, a second wireless network, and a mobile station, the first wireless network comprising the access point, the second wireless network comprising a base station and a gateway apparatus, the access point storing an identification of the mobile station and a master session key of the mobile station, the handshake method comprising the steps of:

building an IP security tunnel between the access point and the gateway apparatus;
receiving a notification signal from the mobile station; and
transmitting the identification and the master session key to the gateway apparatus via the IP security tunnel after the receipt of the notification signal so that the gateway apparatus generates an authorization key according to the master session key and the identification and transmits the authorization key to the base station so that the base station and the mobile station perform the handshake with the authorization key.

12. The handshake method as claimed in claim 11, wherein the access point communicates with the mobile station based on the IEEE 802.11 standard.

13. A gateway apparatus for use in a wireless network framework, the wireless network framework comprising a mobile station, a first wireless network, and a second wireless network, the first wireless network comprising an access point, the access point storing an identification of the mobile station and a master session key of the mobile station, the second wireless network comprising a base station and a gateway apparatus, the gateway apparatus comprising:

a transmission/receiving module, being configured to build an IP security tunnel between the access point and the gateway apparatus and receive the identification and the master session key from the access point via the IP security tunnel; and
a process module, being configured to generate an authorization key according to the master session key and the identification;
wherein the transmission/receiving module is further configured to receive a mobile station preattachment request signal, the mobile station preattachment request signal is generated by the base station after the base station receives a subscriber station basic capability request signal, the transmission/receiving module is further configured to transmit a mobile station preattachment response signal comprising the authorization. key to the base station after the receipt of the mobile station preattachment request signal so that the base station generates and transmits a subscriber station basic capability response signal to the mobile station according to the authorization key so that the base station and the mobile station perform the handshake according to the subscriber station basic capability response signal.

14. The gateway apparatus as claimed in claim 13, wherein the gateway apparatus conforms to the IEEE 802.16 standard.

15. A handshake method for use in a gateway apparatus in a wireless network framework, the wireless network framework comprising a first wireless network, a second wireless network, and a mobile station, the first wireless network comprising an access point, the access point storing an identification of the mobile station and a master session key of the mobile station, the second wireless network comprising a gateway apparatus and a base station, the handshake method comprising the steps of:

building an IP security tunnel between the access point and the gateway apparatus;
receiving the master session key and the identification from the access point via the IP security tunnel;
generating an authorization key according to the master session key and the identification;
receiving a mobile station preattachment request signal from the base station, where the mobile station preattachment request signal is generated by the base station after the base station receives a subscriber station basic capability request signal; and
transmitting a mobile station preattachment response signal comprising the authorization key to the base station after the receipt of the mobile station preattachment request signal so that the base station generates and transmits a subscriber station basic capability response signal to the mobile station according to the authorization key so that the mobile station and the base station perform the handshake according to the subscriber station basic capability response signal.

16. The handshake method as claimed in claim 15, wherein the handshake method conforms to the IEEE 802.16 standard.

17. A base station for use in a wireless network framework, the wireless network framework comprising a mobile station, a first wireless network and a second wireless network, the first wireless network comprising an access point, the second wireless network comprising the base station and a gateway apparatus, an IP security tunnel existing between the access point and the gateway apparatus, the access point transmits a master session key and an identification of the mobile station to the gateway apparatus via the IP security tunnel, the gateway apparatus generating, and storing an authorization key according to the master session key and the identification, the base station comprising:

a transmission/receiving module, being configured to receive a subscriber station basic capability request signal from the mobile station, transmit a mobile station preattachment request signal to the gateway apparatus after the receipt of the subscriber station basic capability request signal, receive a mobile station preattachment response signal comprising the authorization key from the gateway apparatus, an transmit a subscriber station basic capability response signal to the mobile station after the receipt of the mobile station preattachment response signal; and
a process module, being configured to generate the mobile station preattachment request signal after the receipt of the subscriber station basic capability request signal and generate the subscriber station basic capability response signal according to the authorization key comprised in the mobile station preattachment response signal;
wherein the process module is further configured to perform the handshake with the mobile station with the authorization key after the mobile station receives the subscriber station basic capability response signal.

18. The base station as claimed in claim 17, wherein transmission/receiving module is further configured to receive a ranging request signal and transmit a ranging response signal to the mobile station before receiving the subscriber station basic capability request signal so that the mobile station transmit the subscriber station basic capability request signal after the mobile station receives the ranging response signal.

19. The base station as claimed in claim 17, wherein the base station communicates with the mobile station and the gateway apparatus based on the IEEE 802.16 standard, and the base station and the mobile station perform the 3-way handshake conforming to the 802.16 standard.

20. A handshake method for use in a base station in a wireless network framework, the wireless network framework comprising a mobile station, a first wireless network and a second wireless network, the first wireless network comprising an access point, the second wireless network comprising the base station and a gateway apparatus, an IP security tunnel existing between the access point and the gateway apparatus, the access point transmits a master session key and an identification of the mobile station to the gateway apparatus via the IP security tunnel, the gateway apparatus generating and storing an authorization key according to the master session key and the identification, the handshake method comprising following steps of:

receiving a subscriber station basic capability request signal from the mobile station;

generating a mobile station preattachment request signal after the receipt of the subscriber station basic capability request signal;

transmitting the mobile station preattachment request signal to the gateway apparatus after the receipt of the subscriber station basic capability request signal;

receiving a mobile station preattachment response signal comprising the authorization key from the gateway apparatus;

generating a subscriber station basic capability response signal according to the authorization key comprised in the mobile station preattachment response signal;

transmitting the subscriber station basic capability response signal to the mobile station after the receipt of the mobile station preattachment response signal; and performing the handshake with the mobile station with the authorization key after the mobile station receives the subscriber station basic capability response signal.

21. The handshake method as claimed in claim 20, further comprising the steps of:

receiving a ranging request signal before receiving the subscriber station basic capability request signal; and transmitting a ranging response signal to the mobile station after the receipt of the ranging request signal so that the mobile station transmits the subscriber station basic capability request signal after the mobile station receives the ranging response signal.

22. The handshake method as claimed in claim 20, wherein the base station communicates with the mobile station and the gateway apparatus based on the IEEE 802.16 standard, and the base station and the mobile station perform the handshake conforming to the IEEE 802.16 standard.

23. A mobile station for use in wireless network framework, the wireless network framework comprising a first wireless network and a second wireless network, the first wireless network comprising an access point, the second wireless network comprising a gateway apparatus and a base station, an IP security tunnel existing between the access point and the gateway apparatus, the gateway apparatus storing a master session key, the mobile station comprising:

a storage module, being configured to store the master session key;

a transmission/receiving module, being configured to transmit a notification signal to the base station so that the base station generates and transmits another notification signal to the gateway apparatus in response to the notification signal to make the gateway apparatus transmit the master session key to the access point via the IP security tunnel after the receipt of the another notification signal, the transmission/receiving module is further configured to transmit an association request signal to the access point and receive an association response signal after the transmission of the association request signal; and a process module, being configured to generate a pair-wise temporary key according to the master session key stored in the storage module;

wherein the transmission/receiving module is further configured to perform the handshake with the access point with the pair-wise temporary key.

24. The mobile station as claimed in claim 23, wherein the mobile station communicates with the base station based on the IEEE 802.16 standard, and the mobile station and the access point perform the 4-way handshake conforming to the IEEE 802.16 standard.

25. A handshake method for use in a mobile station in a wireless network framework, the wireless network framework comprising a first wireless network and a second wireless network, the first wireless network comprising an access point, the second wireless network comprising a gateway apparatus and a base station, the mobile station storing a master session key, the gateway apparatus storing the master session key, an IP security tunnel existing between the access point and the gateway apparatus, the handshake method comprising the steps of:

transmitting a notification signal to the base station so that the base station generates and transmits another notification signal to the gateway apparatus after the base station receives the notification signal to make the gateway apparatus transmit the master session key stored in the gateway apparatus to the access point via the IP security tunnel after the gateway apparatus receives the another notification signal;

transmitting an association request signal to the access point;

receiving an association response signal from the access point after the transmission of the association request signal;

generating a pair-wise temporary key according to the master session key; and performing the handshake with the pair-wise temporary key.

26. The handshake method as claimed in claim 25, wherein the mobile station and the base station perform the 4-way handshake conforming to the IEEE 802.16 standard.

27. An access point for use in a wireless network framework, the wireless network framework comprising a mobile station, a first wireless network, and a second wireless network, the first wireless network comprising the access point, the second wireless network comprising a gateway apparatus and a base station, the gateway apparatus storing a master session key of the mobile station, the access point comprising:

a transmission/receiving module, being configured to build an IP security tunnel between the access point and the gateway apparatus and receive the master session key from the gateway apparatus via the IP security tunnel;

a process module, being configured to generate a pair-wise temporary key according to the master session key; and a storage module, being configured to store the master session key;

wherein the transmission/receiving module is further configured to receive an association request signal from the mobile station after receiving the master session key, transmit a association response signal to the mobile station after the receipt of the association request signal, and perform the handshake with the mobile station with the pair-wise temporary key.

28. The access point as claimed in claim 27, wherein the mobile station and the base station perform the 4-way handshake conforming to the IEEE 802.16 standard.

29. A handshake method for use in an access point in a wireless network framework, the wireless network framework comprising a mobile station, a first wireless network, and a second wireless network, the first wireless network comprising the access point, the second wireless network comprising a gateway apparatus and a base station, the gateway apparatus storing a master session key, the handshake method comprising the steps of:
   building an IP security tunnel between the access point and the gateway apparatus;
   receiving the master session key from the gateway apparatus via the IP security tunnel;
   generating a pair-wise temporary key according to the master session key;
   receiving an association request signal from the mobile station after receiving the master session key;
   transmitting an association response signal to the mobile station after the receipt of the association request signal; and
   performing the handshake with the mobile station with the pair-wise temporary key.

30. The handshake method as claimed in claim 29, wherein the access point and the mobile station perform the 4-way handshake conforming to the IEEE 802.16 standard.

31. A gateway apparatus for use in a wireless network framework, the wireless network framework comprising a mobile station, a first wireless network, and a second wireless network, the first wireless network comprising an access point, the second wireless network comprising the gateway apparatus and a base station, the gateway apparatus comprising:
   a storage module, being configured to store a master session key; and
   a transmission/receiving module, being configured to build an IP security tunnel between the access point and the gateway apparatus, receive a notification signal from the base station, and transmit the master session key to the access point via the IP security tunnel after the receipt of the notification signal so that the access point generates a pair-wise temporary key according to the master session key to perform the handshake with mobile station.

32. The gateway apparatus as claimed in claim 31, wherein the gateway apparatus communicates with the base station based on the IEEE 802.16 standard.

33. A handshake method for use in a gateway apparatus in a wireless network framework, the wireless network framework comprising a mobile station, a first wireless network, and a second wireless network, the first wireless network comprising an access point, the second wireless network comprising the gateway apparatus and a base station, the gateway apparatus storing a master session key, the handshake method comprising the steps of:
   building an IP security tunnel between the access point and the gateway apparatus;
   receiving a notification signal from the base station; and
   transmitting the master session key to the access point via the IP security tunnel after the receipt of the notification signal so that the access point generates a pair-wise temporary key according to the master session key to perform the handshake with mobile station.

34. The handshake method as claimed in claim 33, wherein the gateway apparatus communicates with the base station based on the IEEE 802.16 standard, 35. A base station for use in a wireless network framework, the wireless network framework comprising a mobile station, a first wireless network, and a second wireless network, the mobile station storing a master session key, the first wireless network comprising an access point, the second wireless network comprising the base station and a gateway apparatus, an IP security tunnel existing between the access point and the gateway apparatus, the gateway apparatus storing the master session key, the base station comprising:
   a transmission/receiving module, being configured to receive a notification signal from the mobile station, generates another notification signal after the receipt of the notification signal, and transmit the another notification signal to the gateway apparatus so that the gateway apparatus transmits the master session key stored in the gateway apparatus to the access point via the IP security tunnel after the gateway apparatus receives the another notification signal, and the access point generates a pair-wise temporary key according to the master session key to perform the handshake with the mobile station.

36. The base station as claimed in claim 3, wherein the base station communicates with the mobile station and the gateway apparatus based on the IEEE 802.16 standard.

37. A handshake method for use in a base station in a wireless network framework, the wireless network framework comprising a mobile station, a first wireless network, and a second wireless network, the mobile station storing a master session key, the first wireless network comprising an access point, the second wireless network comprising the base station and a gateway apparatus, an IP security tunnel existing between the access point and the gateway apparatus, the gateway apparatus storing the master session key, the handshake method comprising the steps of:
   receiving a notification signal from the mobile station;
   generating another notification signal after the receipt of the notification signal; and
   transmitting the another notification signal to the gateway apparatus so that the gateway apparatus transmits the master session key to the access point via the IP security tunnel after the receipt of the another notification signal to make the access point generate a pair-wise temporary key according to the master session key to perform the handshake with the mobile station.

38. The handshake method as claimed in claim 37, wherein the base station communicates with the mobile station and the gateway apparatus based on the IEEE 802.16 standard.

* * * * *